Jan. 11, 1955 D. A. WHITESELL Re. 23,923

FOLDABLE WHEEL DOLLY

Original Filed Dec. 14, 1951 2 Sheets-Sheet 1

INVENTOR

Denham A. Whitesell

BY Beale & Jones

ATTORNEYS

FOLDABLE WHEEL DOLLY

Original Filed Dec. 14, 1951 2 Sheets-Sheet 2

INVENTOR
Denham A. Whitesell

BY
Beale and Jones
ATTORNEYS

United States Patent Office

Re. 23,923

Reissued Jan. 11, 1955

23,923

FOLDABLE WHEEL DOLLY

Denham A. Whitesell, Staunton, Va.

Original No. 2,670,092, dated February 23, 1954, Serial No. 261,729, December 14, 1951. Application for reissue June 24, 1954, Serial No. 439,171

11 Claims. (Cl. 214—330)

Matter enclosed in heavy brackets [ ] appears in the original patent but forms no part of this reissue specification; matter printed in italics indicates the additions made by reissue.

This invention relates to dollies for moving vehicle wheel and tire assemblies, and more particularly to a spring suspended dolly which can receive the shocks incident to moving wheel and tire assemblies onto and off of the dolly without damage to the dolly.

It is among the objects of the invention to provide an improved tire-moving dolly and track assembly including a foldable track and means for releasably locking the dolly at one end of the track for folding the latter; which includes a two-part track, the two parts of which are foldable together with the dolly included therebetween; which includes a spring suspended dolly so that tires can be moved onto and off of the dolly without danger of smashing or breaking the dolly; which provides guards enclosing the dolly rollers so that tires on the dolly do not interfere with the operation of the rollers; which includes a tiltable dolly which can be inclined to receive tire and wheel assemblies from or mount tire and wheel assemblies on an inclined vehicle axle; which will simultaneously receive both tire and wheel assemblies of a dual wheel arrangement; and which is simple and durable in construction, economical to manufacture, easy to use, and effective and efficient in use.

Other objects and advantages will become apparent from a consideration of the following description and appended claims in conjunction with the accompanying drawings, wherein:

Figure 1:
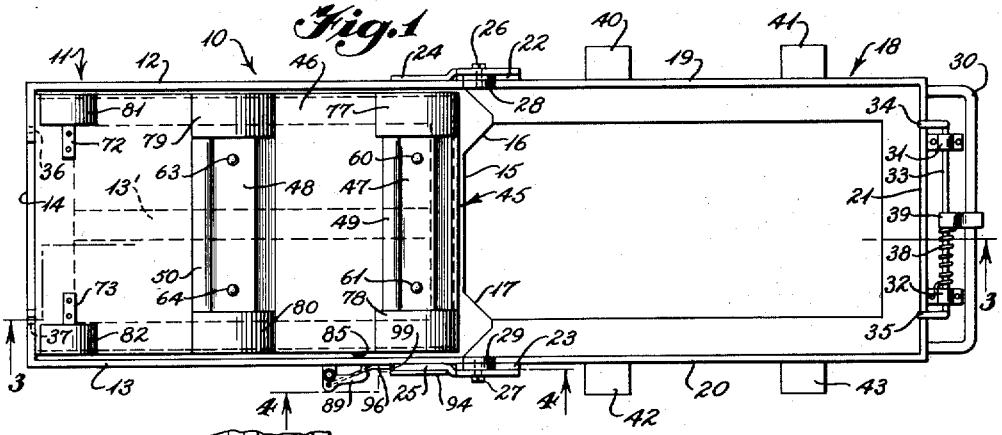
Figure 1 is a top plan view of a track and dolly assembly illustrative of the invention.
Figure 2:
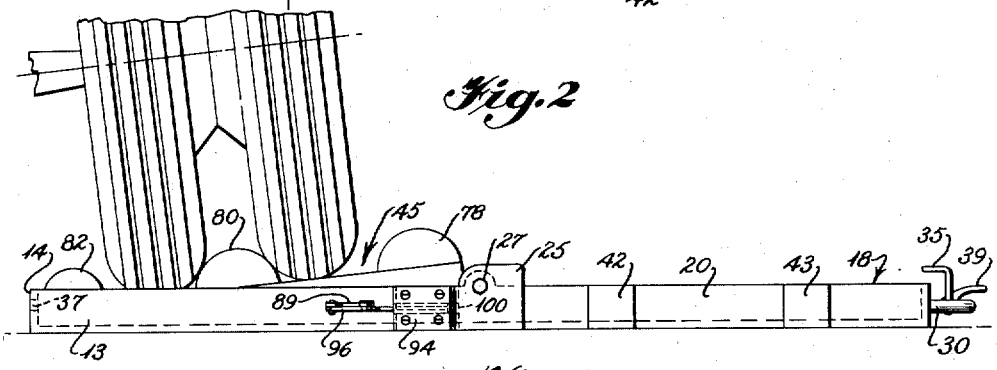
Figure 2 is a side elevational view of the track and dolly assembly with the track in unfolded condition, as illustrated in Figure 1.
Figure 4:
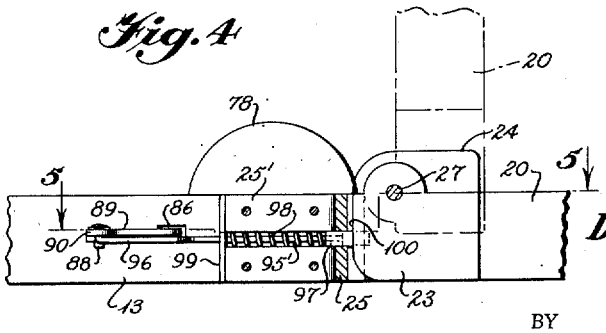

Figure [4] *3* is a longitudinal cross-sectional view on the line [4—4] *3—3* of Figure 1;

*Figure 4 is a sectional view along line 4—4 of Figure 1 on an enlarged scale showing a part of the track in broken line in partly folded condition;*

Figure 5:
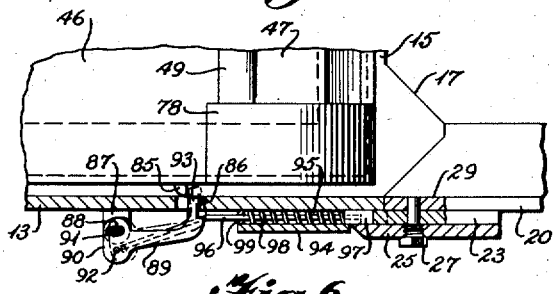
Figure 6:
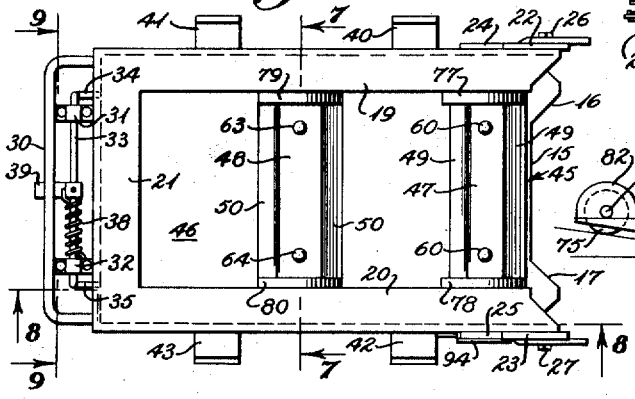
Figure 7:
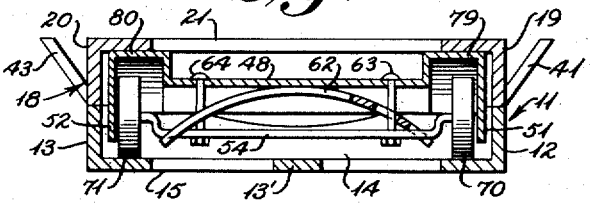
Figure 7A:
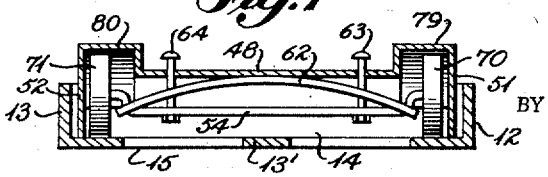

Figure 5 is a fragmentary cross-sectional view on an enlarged scale on the line 5—5 of Figure [2] *4*;

Figure 6 is a top plan view of the track and dolly with the track in folded condition;

Figure 7 is a transverse cross-sectional view on the line 7—7 of Figure 6;

*Figure 7a is a view similar to Figure 7 with the track parts folded down into alignment and with the dolly platform depressed so that its flanges are resting on the track therebeneath as when overloaded;*

Figure 9:
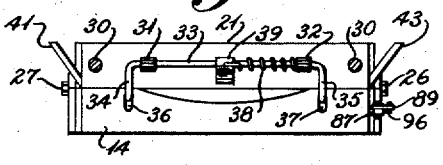
Figure 10:
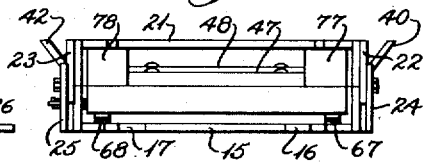
Figure 11:
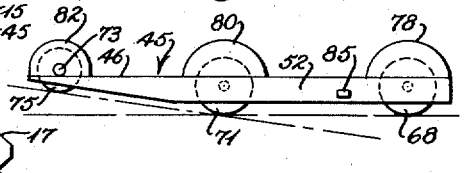
Figure 12:
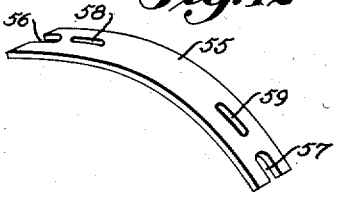
Figure 8:
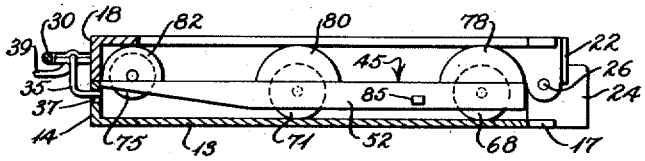

Figure 8 is a longitudinal cross-sectional view on the line 8—8 of Figure 6;

Figure 9 is a transverse cross-sectional view on the line 9—9 of Figure 6;

Figure 10 is an end elevational view of the track and dolly assembly with the track in folded condition, looking at the right-hand end of the assembly as illustrated in Figure 6;

Figure 11 is a side elevational view of the dolly;

Figure 12 is a perspective view of a dolly suspension spring; [and]

Figure 13:
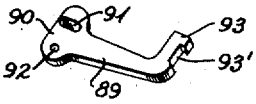

Figure 13 is a perspective view of a dolly latch lever constituting an operative component of the assembly [.]; *and*

Figure 14:
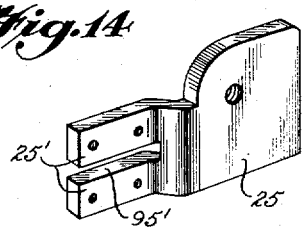

*Figure 14 is a perspective view on an enlarged scale of the left hand hinge plate in Figure 1.*

With continued reference to the drawings, the dolly assembly includes a track, generally indicated at 10, of elongated, rectangular shape including two parts pivotally connected together in end-to-end relationship for movement relative to each other about an axis extending transversely of the track intermediate the length thereof.

The track part 11 comprises side members 12 and 13 disposed in spaced apart and substantially parallel relationship to each other and end members 14 and 15 connected at their ends to the side members 12 and 13 at the corresponding ends of the latter and disposed substantially perpendicularly thereto.

The side members 12 and 13 and the end member 14 are of right-angular, cross-sectional shape having flat flanges disposed at the bottom side of the track and adapted to rest on a supporting surface, such as a garage or shop floor and having legs upstanding perpendicularly from the flanges, and the end member 15 is a flat bar disposed substantially in the plane of the flanges of the side members 12 and 13 and having triangular projections 16 and 17 disposed one near each end thereof and extending in a direction away from the adjacent ends of the side members 12 and 13, respectively.

*A central reinforcing flat bar 13'; lying substantially in the plane of the flanges of side members 12 and 13, extends parallel to the flanges of the side members 12 and 13 midway therebetween with its ends attached to the end members 14 and 15 as by welding.*

The track part 18 comprises spaced apart and substantially parallel side members 19 and 20 and an end member 21 extending between and connected at its ends to the side members 19 and 20 at one end of the frame part 18. The side members 19 and 20 and the end member 21 are also of right-angular, cross-sectional shape, each part including a flange portion disposed at the bottom of the track and adapted to rest on a floor or other horizontal support and a leg upstanding substantially perpendicularly from the flange portion. At their ends remote from the cross member 21 the flanges of the side members 19 and 20 are beveled, as illustrated in Figure 1, to lie along the outer sides of the triangular extensions 16 and 17, respectively, and hinge plates 22 and 23 are connected to the side members 19 and 20, respectively, at the outer sides of the upstanding legs of these side members and at the ends thereof remote from the cross member 21.

Hinge plates 24 and 25 are secured to the side members 12 and 13 of the track part 11 at the outer sides of the legs of the side members and at the ends thereof adjacent the end member 15, and these hinge plates 24 and 25 extend beyond the end member 15 and are offset outwardly of the corresponding side members 12 and 13 to overlie the hinge plates 22 and 23 on the side members 19 and 20.

*In Figure 14 hinge plate 25 is shown formed with offset bifurcated portions 25'—25' having a horizontal slot 95' therebetween.*

A pivot bolt 26 extends through registering apertures in the hinge plates 22 and 24, and a complementary pivot bolt 27 extends through registering apertures in the hinge plates 23 and 25, these bolts serving as hinge pins pivotally connecting the track part 18 to the track part 11 for folding movement of the two track parts relative to each other about an axis extending transversely of the track.

The ends of the upstanding legs of the side members 19 and 20 are preferably extended upwardly in semicircular form, as indicated at 28 and 29, and apertured to receive the bolts 26 and 27 to reinforce the pivotal connection between the two frame parts. The beveled ends of the flange portions of the side members 19 and 20, together with the outer sides of the triangular extensions 16 and 17, provide break lines extending diagonally of the side member flanges at the location of the pivotal connection between the two parts of the frame, so that dolly wheels may roll over these break lines without encountering any substantial unevenness in the flange portions of the track.

A U-shaped handle 30 is connected at its ends to the end member 21 near the opposite ends of the latter and extends outwardly from this end member to provide convenient means for manually raising and lowering the outer end of the track part 18. Apertured lugs 31 and 32 also project outwardly from the end member 21 one near each end thereof, and a latch rod 33 is journaled in these lugs and provided at its ends with hook formations 34 and 35 which engage in apertures 36 and 37 provided in the upstanding leg of the end member 14 when the two parts of the track are folded together to releasably latch the two parts of the track in folded condition, as is particularly illustrated in Figure 9.

A torsion spring 38 surrounds the latch rod 33 adjacent the lug [38] *32* and is connected at one end to this lug and at its other end to the latch bar and acts to resiliently urge the hook formations 34 and 35 inwardly of the apertures or recesses 36 and 37 when the track parts are folded together and a handle 39 is provided on the latch rod for manually moving the hook formations out of the corresponding recesses.

Rectangular plates 40 and 41 are secured each along one edge thereof to the upstanding leg of the track side member 19 at spaced apart locations along this side member, and are inclined outwardly and downwardly from the top edge of the upstanding leg of the side member. Similar plates 42 and 43 are secured each along one edge to the upstanding leg of the track side member 20 at the upper edge of this leg and at locations spaced apart longitudinally thereof and are inclined outwardly and downwardly from the top edge of the upstanding leg of this track side member. These plates 40, 41, 42 and 43 constitute ramps to facilitate rolling pneumatic tires over the upstanding legs of the track side members 19 and 20 when the tires are moved onto or moved off of the associated dolly.

Figure 3:
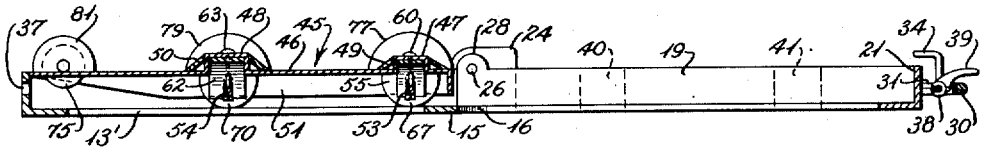
[Figure 3 is a side elevational view of the track in partly folded condition;]

The dolly, generally indicated at 45, comprises a plate 46 of rectangular shape having a width substantially equal to the distance between the upstanding legs of the track side members. [and] *The length of the dolly 45 may be approximately one-half the length of the track 10. Referring to Figures 1, 3, and 6, the dolly 45 may extend from where its left hand end is adjacent end 14 of tank part 11 to where its right hand end may terminate in alignment with the right hand end of hinge plates 22 and 23. However, the dolly is shown as having* a length somewhat less than one-half the length of the track *and* provided with transversely extending ribs 47 and 48 of channel-shaped cross-section extending transversely thereof one near one end and one near the mid-length location thereof, and projecting upwardly from the normally upper surface of the plate. The ridges 47 and 48 are reinforced by inclined gussets, as indicated at 49 and 50, extending from the upper edges of the ribs 47 and 48 to the upper surface of the plate 46 at locations spaced from the adjacent lower edges of the ribs.

The plate 46 has flanges 51 and 52 extending perpendicularly one from each longitudinal edge thereof substantially perpendicular to the plate and in a direction away from the ribs 47 and 48, so that these flanges depend from the platform portion of the plate when the dolly is in operative, upright position, as illustrated in Figures [4] *3* and 11. These flanges give longitudinal rigidity to the plate, while the ribs 47 and 48 provide transverse rigidity, and the edges of the flanges remote from the plate are inclined toward the plate from a location between the rib 48 and the end of the plate remote from the rib 47 to the end of the plate remote from the rib 47, so that the platform of the dolly can be tilted by raising the end of the dolly adjacent the rib 47. *The flanges 51 and 52 extend vertically and in spaced relation above the flanges of track side members 12 and 13 and rest thereon when the dolly 45 is overloaded as shown in Figure 7a.*

An axle 53 extends transversely of the dolly platform below the rib 47 and a similar axle 54 extends transversely of the platform below the rib 48. A bowed, flat spring 55 is disposed in the rib 47 with its center portion convexly opposed to the under side of the web of the channel-shaped rib, and is provided in its end with notches 56 and 57 in which the axle 53 is received near the respectively opposite ends of the axle. The spring is also provided with apertures 58 and 59 disposed near the inner ends of the notches 56 and 57, respectively, and elongated longitudinally of the spring. Bolts 60 and 61 extend through apertures in the web portion of the rib 47 one near each end of the rib and through the apertures 58 and 59 in the spring 55 to secure the spring in the rib.

A spring 62, similar to the spring 55 but preferably somewhat wider and stiffer than the spring 55, is disposed in the rib 48 and provided at its ends with notches receiving the axle 54 and near the notches with elongated apertures receiving bolts, as indicated at 63 and 64 which extend through apertures in the web portion of the rib 48 and through the elongated apertures in the spring 62 to secure the spring in the rib.

*Thus, when a load is received on the platform 48, springs 55 and 62 will flex, as shown in Figure 7a, and move with respect to their securing bolts, 60—61 for spring 55, and 63—64 for spring 62. So also the slotted ends of the springs will move along the axles 53 and 54 extending therethrough. Should the load be excessive for the springs 55 and 62, the platform 46 is depressed so that its longitudinal side flanges 51 and 52 contact the tracks therebelow and the load is transferred to the tracks without damage to the dolly.*

Rollers 67 and 68, preferably in the form of sealed roller bearings, are mounted on the axle 53, one at each end of the axle and corresponding rollers 70 and 71 are mounted on the axle 54, one at each end thereof, and are adapted to run on the flange portions of the side members of the track.

Stub axles [71] *73* and 72 are secured on the plate 46 adjacent the end of the plate remote from the rib formation 47 and project laterally from the plate one at each side of the latter. Rollers 74 and 75 are mounted on the stub axles 72 and 73, respectively, and are disposed at the opposite sides of the platform plate 46 of the dolly, these last mentioned rollers being smaller than the rollers 67, 68, 70 and 71, to provide for tilting of the dolly, as mentioned above.

Fenders 77 and 78 of substantially semicylindrical shape are mounted on the platform plate 46 and receive the upper portions of the rollers 67 and 68, respectively, to guard the portions of these rollers extending above the platform plate against contact with tires supported on the platform. Similar fenders 79 and 80 are mounted on the platform plate and cover the upper portions of the rollers 70 and 71, while fenders 81 and 82 of substantially the same shape but smaller than the above-described rollers, are mounted on the platform plate and receive the upper portions of the rollers 74 and 75, respectively.

With the above-described arrangement, when it is desired to remove heavy pneumatic tires from a vehicle such as a truck or bus, the end of the associated axle adjacent the tire or tires to be removed is raised by a jack until the tires are lifted a sufficient distance above the floor to permit the end member 14 of the track to pass under the tires. The track in unfolded condition is then slid along the floor until the part 11 of the track is under the tire or tires to be removed, and the dolly is moved onto this part of the track and disposed under the tire or tires. The tire-carrying wheels will now be released from the associated axle, and, if necessary, the corresponding end of the axle slightly lowered to free the wheels from the axle with the tire supported on the dolly. The dolly will now tilt to a position in which it is substantially parallel to the axle one end of which has been raised by the jack. With the wheels free of the axle, the dolly is moved back from the track portion 11 onto the track portion 18, and the tires may now be rolled off of the dolly and down the ramps 40 and 41 or 42 and 43 to the floor.

When the tires and wheels are replaced on the axle, with the dolly in the part 18 of the track, the tires and wheels are rolled up selected ramp plates onto the dolly, and the dolly is then moved onto the part 11 of the track, tilting as necessary, to align the wheel hubs with the end of the corresponding axle, and slide the wheels onto the axle, the inclination of the dolly particularly facilitating the sliding of the brake drum carried by the wheel or by the inner wheel of a dual wheel set, over the brake shoes mounted on the axle.

When the dolly is not in use, the track is preferably folded into the compact condition illustrated in Figures 6 [to 10, inclusive?], *7, 8–10, inclusive,* for convenient storage. In order to accomplish this, the dolly 45 is positioned on the track 11 and the handle 30 is manually raised, bringing the track part 18 first to the upright position illustrated in Figure [3] *4*.

When the dolly is not in use, the track is preferably folded into the compact condition illustrated in Figures 6 to 10, inclusive, for convenient storage. In order to accomplish this, the dolly 45 is positioned on the track part 11 and the handle 30 is manually raised, bringing the track part 18 first to the upright position illustrated in Figure 3.

A lug or detent 85 is mounted on the side flange 52 of the dolly adjacent the upstanding leg of the side member 13 of the frame, and the upstanding leg of the side member 13 is provided with an aperture 86 adjacent the detent 85. A lug 87 projects outwardly from the outer side of the upstanding leg of the frame side member 13 at a location spaced from the aperture 86 and carries an upwardly extending bolt or rivet 88. A latch lever 89 has at one end an enlarged formation 90 provided with an elongated aperture 91 receiving the pin 88 and with an aperture 92 spaced from the aperture 91. At its other end the lever 89 is provided with a hook formation 93 which projects through the aperture 86 in the upstanding leg of the frame side member 13.

A guide plate 94 is mounted on the outer side of the [upstanding leg of the frame side member 13 between the aperture 86 in the leg and the hinge plate 25 and provides a bore 95 extending longitudinally of the upstanding leg of the frame side members 13.], *bifurcations 25'—25' and forms a side cover for slot 95' and a bore 95 is thereby formed.* A rod 96 extends through the bore 95 and has at one end an offset formation received in the aperture 92 in the latch lever 93. A plunger 97 is mounted on the other end of the rod 96 and bears at its distal end against the adjacent edge *100* of the hinge plate 23, and a compression spring 98 surrounds the rod within the bore 95 between the inner or proximal end of the plunger 97 and an abutment 99 at the end of the bore 95 adjacent the aperture 86. [The hinge plate 23 has its corner adjacent the pivot bolt 100 rounded off on an arcuate curve centered on the axis of the bolt 27.]

With this arrangement, when the frame part 18 has been brought to the upright position illustrated in Figure [3] *4*, the edge of the hinge plate 23 engaged by the plunger [27] *97* will have been moved away from the plunger, so that the spring 98 will move the rod 96 in a direction to project the hook formation 93 of the latch lever 89 through the aperture 86 and into engagement with the detent 85 on the adjacent side flange of the dolly to lock the dolly in the portion 11 of the frame. *The hook 93 has a cut out portion 93' in its edge which seats against the adjacent edge of aperture 86 in side member 13 due to the movement of the latch lever 89 permitted by its elongated slot 91 therein.* The frame part 18 is then swung over until it is superimposed on the frame part 11, as illustrated in Figures 9 and 10, and the hook formations 34 and 35 of the latch rod 33 are engaged in the apertures 36 and 37 to latch the two parts of the frame in folded condition with the dolly 45 included therebetween.

When the dolly is again unfolded for use, the latch plate 23 moves the plunger 97 in a direction to pull the hook formation 93 of the latch lever 89 outwardly of the aperture 86 and away from the detent 85 to release the dolly for movement longitudinally of the frame when the latter is in unfolded condition.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A vehicle tire dolly comprising a track of elongated rectangular shape including two parts of substantially equal length pivotally connected together in end-to-end relationship for movement relative to each other about an axis extending transversely of said track, a dolly having a length somewhat less than one-half the length of said track mounted on the latter for movement from one end to the other end thereof, the two parts of said track being foldable together with said dolly disposed therebetween, and latch means carried by one of said track parts and engageable with said dolly as said track parts are folded together to hold said dolly on said one track part while said track parts are being folded, said latch means being released to free said dolly upon unfolding of said track parts.

2. A vehicle tire-moving dolly assembly comprising a track of elongated rectangular shape and a dolly adapted to run on said track and including a platform of rectangular shape having ribs of channel-shaped cross-section extending transversely thereof adjacent one end and the mid-length location of said platform and flanges extending one along each longitudinal edge of said platform, axles extending transversely of said platform one adjacent the open side of each of said ribs, rollers mounted one on each end of each axle, springs disposed one in each of said ribs and engaging the corresponding axles supporting said platform on said rollers, rollers smaller than the above-mentioned rollers mounted on said platform one at each side and at the other end thereof for supporting said platform in a tilted position, and fenders mounted on said platform and respectively receiving the portions of said rollers extending above said platform.

*3. A vehicle tire dolly comprising a track including two parts of substantially equal length pivotally connected together in end-to-end relationship for movement relative to each other about an axis extending transversely of said track, a dolly having a length approximately one-half the length of said track mounted on the latter for movement from one end to the other end thereof, the two parts of said track being foldable together with said dolly disposed therebetween and latch means carried by one of said track parts and engageable with said dolly as said track parts are folded together to hold said dolly on said one track part while said track parts are being folded, said latch means being released to free said dolly upon unfolding of said track parts.*

*4. A vehicle tire-removing dolly assembly comprising a track of elongated rectangular shape and a dolly adapted to run on said track and including a platform of rectangular shape having ribs of channel-shaped cross-section extending transversely thereof adjacent one end and the mid-length location of said platform and flanges extending one along each longitudinal edge of said platform, axles extending transversely of said platform one adjacent the open side of each of said ribs, rollers mounted one on each end of each axle, springs disposed one in each of said ribs and engaging the corresponding axles supporting said platform on said rollers.*

*5. A vehicle tire dolly comprising a track of elongated rectangular shape including two parts of substantially equal length pivotally connected together in end-to-end relationship for movement relative to each other about an axis extending transversely of said track, a dolly mounted on the track for movement from one end to the other end thereof and adapted to be housed between the two track parts when folded together about said axis, one of said track parts having a laterally extending portion attached thereto, and latch means connecting said dolly and said laterally extending portion to hold said dolly on said one track part.*

*6. A vehicle tire dolly comprising a track of elongated rectangular shape including two parts of substantially equal length pivotally connected together in end-to-end relationship for movement relative to each other about an axis extending transversely of said track, and a dolly mounted on the track for movement from one end to the other end thereof, and adapted to be housed between the two tracks when folded together about said axis, said dolly having a platform, transversely extending axles, rollers mounted one on each axle to roll on said track, and spring means yieldable on overload of said dolly to transmit the overload to said track without damage to said dolly.*

*7. A vehicle tire dolly comprising a track of elongated rectangular shape including two parts of substantially equal length pivotally connected together in end-to-end relationship for movement relative to each other about an axis extending transversely of said track, and a dolly mounted on the track for movement from one end to the other thereof, and adapted to be housed between the two tracks when folded together about said axis, said dolly having a platform including longitudinal depending skirt portions along each side that extend downward to where their lower edge is in close spaced relation to said track, and spring means associated with said platform and axles whereby on overload of said dolly, the spring means yield to permit the lower edges of said skirts to rest on said track so that the load on the dolly is transmitted to said track without damage to said dolly.*

*8. A vehicle tire dolly comprising a track of elongated rectangular shape including two parts of substantially equal length pivotally connected together in end-to-end*

*relationship for movement relative to each other about an axis extending transversely of said track, a dolly mounted on the track for movement from one end to the other end thereof and adapted to be housed between the two tracks when folded together about said axis, one of said track parts having a laterally extending portion attached thereto, and latch means connecting said dolly and said laterally extending portion to hold said dolly in between the two track parts when folded together, said dolly including a tire-supporting platform having portions thereof in close spaced relation above said track, transversely extending axles, rollers mounted on the axles and adapted to roll along said track, and spring means yieldable on an overload on said platform causing said portions of the platform in close spaced relation above the tract to contact the track thereby transmitting the overload to the track without damaging said dolly.*

*9. A vehicle tire-moving dolly comprising a track of elongated rectangular shape including two parts pivotally connected together in end-to-end relationship for movement relative to each other about an axis extending transversely of said track, and a dolly having supporting rollers thereon for rolling engagement with said track from one end to the other end thereof and adapted to be housed between the two track parts when folded together about said axis, said track parts comprising spaced apart and substantially parallel side members of right-angular cross-sectional shape, including inwardly directed flanges adapted to rest on a substantially horizontal supporting surface and legs upstanding perpendicularly from said flanges along the outer edges of the latter, and a single end member for each track part connected between said side members at the outer ends thereof, said inwardly directed flanges of each track part that are in alignment having their ends in abutting end-to-end engagement and said abutting ends of the flanges extending at an acute angle to the longitudinal direction of said flanges of each track.*

*10. A vehicle tire-moving dolly for rolling engagement on a flat supporting surface comprising, in combination, a platform of rectangular shape having a plurality of spaced apart ribs of channel-shaped cross-section extending transversely thereof and flanges extending one along each longitudinal edge of said platform, axles extending transversely of said platform one adjacent the open side of*

*each of said ribs, rollers mounted one on each end of each axle, springs disposed one in each of said ribs and engaging the corresponding axles supporting said platform on said rollers thereby permitting said platform, upon overloading to move downwardly uniformly at opposite edges thereof and causing said flanges extending along the longitudinal edges to engage said supporting surface.*

*11. A vehicle tire-moving dolly for rolling engagement on a flat supporting surface comprising, in combination, a platform having spaced side and end edges and having a plurality of spaced apart recessed ribs extending transversely thereof, and having open sides in the lowermost face of said platform, and a plurality of rigid depending platform support members secured to said platform adjacent oppositely and spaced edges thereof, and extending below the lowermost face of said platform, axles extending transversely of said platform, each of said axles being adjacent the open side of one of said ribs, rollers mounted one on each end of each axle, resilient means disposed in each of said ribs and interconnecting said platform and said axles supporting said platform on said rollers, thereby permitting said platform, upon overloading, to move downwardly uniformly at opposite edges thereof and causing said rigid platform support members secured to said platform to engage said supporting surface.*

References Cited in the file of this patent or the original patent

UNITED STATES PATENTS

| | | |
|---|---|---|
| 652,648 | Sommer | June 26, 1900 |
| 1,370,732 | Corbett | Mar. 8, 1921 |
| 1,415,857 | Avery | May 16, 1922 |
| 1,535,762 | Brejska | Apr. 28, 1925 |
| 1,620,323 | Bugatti | Mar. 8, 1927 |
| 1,776,262 | Noir | Sept. 23, 1930 |
| 1,911,240 | Rosenthal | May 30, 1933 |
| 2,246,628 | Heckman | June 24, 1941 |
| 2,456,218 | Semisch | Dec. 14, 1948 |
| 2,484,951 | Kubo | Oct. 18, 1949 |
| 2,503,138 | Smith | Apr. 4, 1950 |
| 2,539,274 | Sagen | Jan. 23, 1951 |
| 2,563,927 | Engle | Aug. 14, 1951 |
| 2,594,270 | Niederhauser | Apr. 22, 1952 |